United States Patent [19]
Anderson et al.

[11] 3,721,478
[45] March 20, 1973

[54] LINEAR ANTIFRICTION BEARING

[75] Inventors: Theodore D. Anderson, Fruitport, William J. Harms, Nunica, both of Mich.

[73] Assignee: Gardner-Denver Company, Quincy, Ill.

[22] Filed: Jan. 25, 1971

[21] Appl. No.: 109,280

[52] U.S. Cl. ............................................. 308/6 C
[51] Int. Cl. .............................................. F16c 29/06
[58] Field of Search ....... 308/6 C, 6 R, 194, 3 R, 3 A, 308/176, 185

[56] References Cited

UNITED STATES PATENTS

| | | | |
|---|---|---|---|
| 3,071,418 | 1/1963 | Hayes | 308/6 C |
| 3,560,061 | 2/1971 | Shaw, Jr. | 308/6 C |
| 3,545,826 | 12/1970 | Magee et al. | 308/6 C |
| 3,608,985 | 9/1971 | Swanson | 308/6 C |
| 3,398,999 | 8/1968 | Halvorsen | 308/6 C |
| 3,588,200 | 6/1971 | Thomson | 308/6 R |
| 2,352,911 | 7/1944 | Osplack | 308/6 R |
| 3,008,774 | 11/1961 | Morris et al. | 308/3 A |
| 3,113,807 | 12/1963 | Polidor | 308/6 R |
| 3,342,534 | 9/1967 | King | 308/6 R |
| 3,436,132 | 4/1969 | Wiesler | 308/6 C |
| 2,863,705 | 12/1958 | Gluchowicz | 308/6 R |
| 3,484,944 | 12/1969 | Pryshlak | 308/6 R |

Primary Examiner—Charles J. Myhre
Assistant Examiner—Barry Grossman
Attorney—Michael E. Martin

[57] ABSTRACT

A linear antifriction bearing arrangement including two relatively movable machine members and a plurality of cylindrical bearing cartridges mounted for providing linear movement of one member with respect to another. Each bearing cartridge includes a raceway and interconnected internal passageways forming a channel for recirculating a plurality of bearing balls. The cartridges include removable retainer plates for retaining and guiding the bearing balls through the recirculation channels. The bearing cartridges are slidably journaled in one of the machine members and are operable to support the other machine member for relative linear movement. The arrangement provides for ease of preloading to provide zero lateral play and the individual cartridges are self-aligning to provide even load distribution.

7 Claims, 6 Drawing Figures inventors
William J. Harms
Theodore D. Anderson
by Michael E. Martin
agent

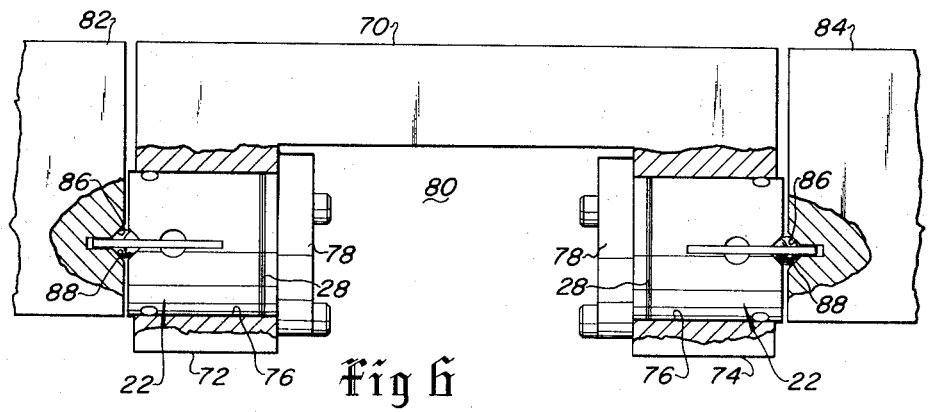

LINEAR ANTIFRICTION BEARING

BACKGROUND OF THE INVENTION

Various types of bearing arrangements are known for providing for linear motion of one machine element with respect to another. In the art of machine tools, for example, it is desirable to provide for precise low friction linear movement of a work supporting table with respect to the frame of the machine or conversely movement of the tool supporting member with respect to the work. Another application of linear motion bearings is found in automated apparatus for making solderless connections of electrical conductors to terminal boards. In automatic conductor wrapping apparatus the conductor wrapping tools and conductor guiding devices must be moved with precision and with relative ease and minimal deflection of the wrapping tool supports is required.

Known types of linear motion bearing arrangements used in the above mentioned applications include the type disclosed in U.S. Pat. No. 2,452,117 which is characterized by a tubular sleeve type of bearing cartridge containing recirculating antifriction bearing elements and adapted to be linearly slidable on a shaft. The disadvantage of this type of arrangement is that the shaft or supporting member must remain unsupported over the traversal distance of the sleeve. Moreover, it is difficult to preload and to determine the amount of preload with the tubular sleeve bearing arrangement.

Another type of linear bearing arrangement is disclosed in U.S. Pat. No. 3,008,774 wherein a plurality of bearing cartridges of the recirculating ball type are arranged to support one member movably with respect to another. Although the particular arrangement disclosed provides wedge-shaped supports for preload adjustment, the entire arrangement is rather complex and the bearing cartridges do not lend themselves to a self-aligning type of mounting.

Known types of linear bearing arrangements are also somewhat lacking in providing for easy insertion and removal of the individual bearing cartridges with respect to the complete assembly. This is a particularly bothersome problem when heavy machine members are involved as components of the bearing arrangement or when it is undesirable to disturb the relative positions of the machine components.

SUMMARY OF THE INVENTION

The present invention provides for an improved linear antifriction bearing arrangement whereby a plurality of bearing cartridges are removably mounted on a machine component and are adapted to support another machine component for reversible rectilinear motion. In the linear antifriction bearing of the present invention, each individual bearing cartridge is adapted to recirculate a number of antifriction bearing elements through a recirculation channel which is simple in construction and reliable in operation.

The present invention further provides for a linear antifriction bearing arrangement which may be preloaded a controlled and measured amount to eliminate any unwanted loose motion between machine components.

In accordance with the present invention there is also provided a linear bearing arrangement in which individual bearing cartridges by virtue of their cylindrical shape are inherently self-aligning.

Moreover, the present invention provides a linear antifriction bearing arrangement including a plurality of bearing cartridges which are individually accessible for removal and replacement without disturbing the machine components which they are supporting.

BRIEF DESCRIPTION OF THE DRAWINGS

FIG. 6 is a transverse elevation of an alternate embodiment of a linear antifriction bearing arrangement in accordance with the present invention.

DESCRIPTION OF THE PREFERRED EMBODIMENTS

Figure 1:
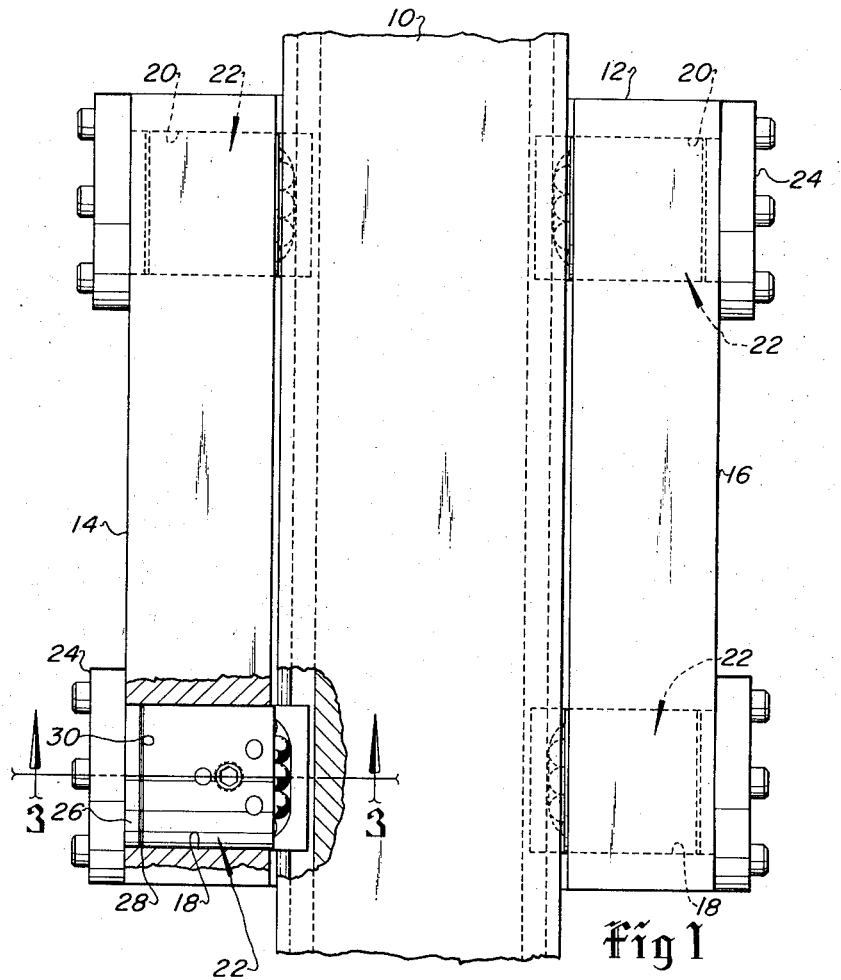
FIG. 1 is a plan view of a linear antifriction bearing arrangement in accordance with the present invention.
Figure 2:
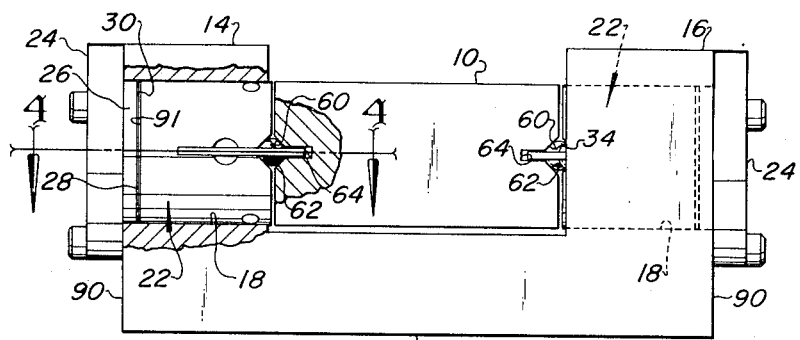
FIG. 2 is a transverse elevation of the bearing arrangement of FIG. 1.

Referring to FIGS. 1 and 2 a linear antifriction bearing arrangement is illustrated as comprising a machine component or member 10 which is linearly movable with respect to another machine member 12. In use in a machine tool or the like the member 10 might be considered to be fixed or comprise a part of the machine frame and the member 12 might comprise the carriage or a movable table. The function of the two members 10 and 12 may be reversed, of course, as it will be assumed to be merely a design choice. The same interchangeability of function will be assumed to be easily achieved with the embodiment of FIG. 6.

The member 12 has a generally U-shaped configuration defined by the furcations 14 and 16 which include pairs of opposed cylindrical bores 18 and 20, spaced apart. Located in each of the bores 18 and 20 in close fitting relationship are recirculating ball bearing cartridges, generally designated by the numeral 22. The bearing cartridges 22 are retained within their respective bores in the member 12 by removable cover members 24 suitably fastened to the member 12 and having pilot diameter portions 26. As will be noted from the exemplary cutaway portion of FIGS. 1 and 2 shims 28 of various thicknesses may be interposed between the end face 30 of the cover 24 and the end face of the bearing cartridge 22.

Referring to FIGS. 1 through 5 the bearing cartridges 22 each comprise a cylindrical support block 32 dimensioned to be slidably journaled but closely fitted in the bores 18 and 20. The support blocks 32 include a plurality of antifriction bearing elements in the form of balls 34 which are operable to circulate reversibly in a channel formed by the passage 36, intersecting passages 38 and 40, and the oppositely inclined planar surfaces 42 and 44. The surfaces 42 and 44 also form a groove comprising a raceway for supporting the balls 34 when they are carrying the load of the members 10 and 12 with respect to each other. The passages 36, 38 and 40 may be formed by a conventional boring or drilling process in view of the fact that the slight ridges or discontinuities formed by the intersections of the surfaces between the passage 36 and the respective passages 38 and 40 are not subject to high contact stresses from the balls 34 when the balls are rolling through these intersections.

The support blocks 32 also include two pins 46 of circular cross section positioned to form contact surfaces for the balls 34 as they recirculate through the channel formed by the aforementioned passages and groove. The pins 46 provide for smooth rolling action of the balls as they roll through the passages 38 and 40 and into and out of the groove formed by the surfaces 42 and 44. The balls 34 are retained in the groove and the passage 36 in the support blocks 32 by substantially flat retaining plates 48 which are fitted in slots 50 formed in the support blocks 32 and bisecting the aforementioned ball recirculation channels. The plates 48 are retained in each support block by a pin 52, FIGS. 3 and 4. The plates 48 include a somewhat oval opening 54 defining the periphery of the recirculation path of the bearing balls 34. The cartridges 22 also include a passageway 56 for loading and removing balls 34 with respect to the recirculation channel. The passageway 56 is fitted with a threaded plug 58.

Figure 3:
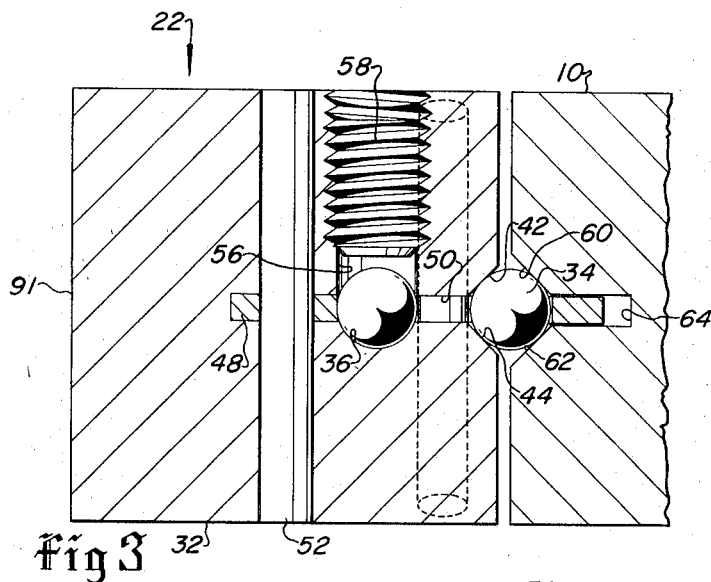
FIG. 3 is a view taken along the line 3—3 of FIG. 1.
Figure 4:
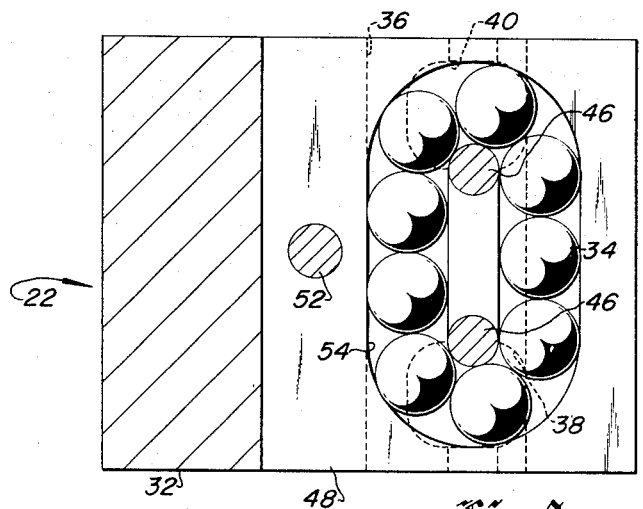
FIG. 4 is a view taken along the line 4—4 of FIG. 2.
Figure 5:
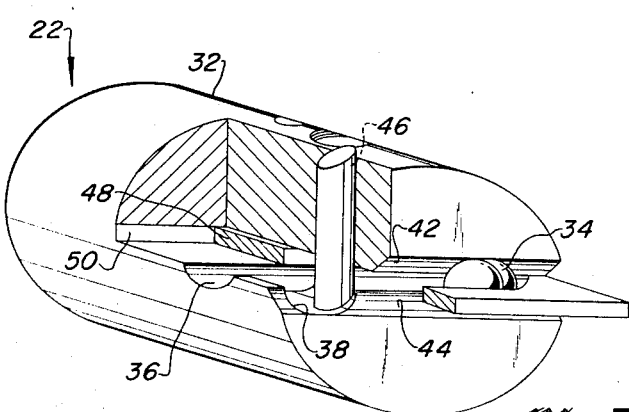
FIG. 5 is a perspective cutaway view of one of the bearing cartridge units.

As shown in FIGS. 2 and 3 the member 10 is provided with a pair of opposed elongated parallel grooves formed by the oppositely inclined planar surfaces 60 and 62, said grooves forming raceways complementary to the raceways formed in each one of the cartridges 22. The member 10 also includes slots 64 formed to provide clearance for the ball retaining plates 48. By providing the inclined surfaces 42 and 44 on the support blocks 32 and the inclined surfaces 60 and 62 on the member 10 together with provisions for prepositioning each pair of opposed cartridges 22 longitudinally in their respective bores 20, contact of the balls 34 on all four surfaces is assured. This four-point contact provides for better load distribution and lower contact stresses on the respective surfaces forming the bearing raceways. Moreover, the surfaces 42, 44, 60, and 62 may be formed by conventional machining techniques.

The cartridges 22, by being rotatably journaled in the bores 18 and 20 tend to align themselves, upon assembly of the arrangement, so that the raceways formed on the cartridges 22 are parallel with the raceways in the member 10 and hence more uniform loading is achieved of all balls in load bearing positions. In the arrangements of FIGS. 1 through 6 at least two balls are in full load carrying position at all times and under some conditions three are in full load carrying position as shown in the drawings. Also by providing the arrangement of the bores in the member 12, as shown, each bore of the pairs of bores 18 and 20 is easily machined by conventional methods to be very closely in alignment with the other bore of the pair.

An alternate embodiment of the present invention is illustrated in FIG. 6. In the embodiment of FIG. 6 a member 70 is provided having a generally U-shaped cross section forming the furcations 72 and 74 which include bores 76 for journalling the bearing cartridges 22. The arrangement of bearing cartridges in the embodiment of FIG. 6 may be in opposed spaced apart pairs as in the arrangement of FIGS. 1 through 5. The cartridges 22 located in the member 70 are retained in the bores 76 by cover members 78 similar to the cover members 24 in FIGS. 1 and 2. The open area 80 between the furcations 72 and 74 provides for easy access to install or remove the individual bearing cartridges 22 or to adjust the preload as in the embodiment of FIGS. 1 and 2. The bearing cartridges 22, in FIG. 6, are arranged to support the member 70 with respect to a member comprising a portion of a machine frame or the like and represented by the portions 82 and 84 having opposed parallel grooves, each groove formed by oppositely inclined planar surfaces 86 and 88.

As previously mentioned the bearing arrangements of the present invention can be preloaded to a controlled and easily measured amount to remove all clearance or looseness of one of the linearly removable members with respect to the other. Upon assembly of the cartridges 22 into their respective bores the thickness of shims 28 required to obtain zero clearance or lateral looseness of the member 10 with respect to the member 12 may be easily measured by obtaining the depth measurement from the surface 90 on the furcation 14 to the end face of the cartridge 22 and subtracting from said measurement the height or length of pilot diameter portion 26 on the cover members 28. To this measured shim thickness required for zero clearance shims of known thickness may be placed between the cover members and the bearing cartridges to give a desired preload force in accordance with a predetermined relationship between shim thickness and preload force values.

The bearing arrangements contemplated by the present invention also enjoy the advantage that when the bearing balls come into contact with the raceways formed in the members 10 and 82–84, upon assembly of the bearing cartridges into the respective members 12 and 70, the cartridges tend to align themselves so that even load distribution is obtained between the bearing balls and the raceways. This self-aligning feature of the bearing arrangements disclosed is enjoyed thanks to the rotatable journalling of the cylindrical bearing cartridges in the members 12 and 70.

What is claimed is:

1. In a linear antifriction bearing arrangement, in combination:

a first member including a pair of opposed elongated parallel grooves forming bearing raceways;

a second member linearly movable with respect to said first member and including a plurality of antifriction bearing cartridges removably mounted thereon, said bearing cartridges each comprising a cylindrical support block including a groove formed thereon and a plurality of antifriction bearing elements operable to roll along said groove on said support block;

said second member having said plurality of bearing cartridges so arranged thereon that at least one bearing cartridge is disposed adjacent each groove of said pair of opposed parallel grooves on said first member and said antifriction bearing elements of each of said plurality of bearing cartridges are engaged with the respective adjacent groove on said first member whereby said second member is supported for linear movement with respect to said first member, said second member including cylindrical bores dimensioned to receive said support blocks in close fitting relationship whereby said support blocks are each operable, upon engagement of their anti-friction bearing elements with said opposed parallel grooves on said first member, to rotate in said bores to align said grooves on said support blocks to be parallel with said pair of opposed parallel grooves on said first member; and, means located in said bores operable to position said support blocks to provide forcible engagement of said antifriction bearing elements with said pair of opposed parallel grooves on said first member and said grooves on said support blocks thereby to pre-load said linear antifriction bearing arrangement.

2. The invention set forth in claim 1 wherein:

said second member includes removable cover members for covering said cylindrical bores to retain said cylindrical support blocks therein and said means for positioning said cylindrical support blocks in said bores includes spacer means interposed in said bores between said cylindrical support blocks and said cover members.

3. In a linear antifriction bearing arrangement, in combination:

a first member provided with two pairs of oppositely inclined planar surfaces each of said pairs of oppositely inclined planar surfaces being arranged on said member to form opposed parallel grooves providing bearing raceways;

a second member having a plurality of antifriction bearing cartridges mounted thereon, each of said bearing cartridges having a recirculation channel and a plurality of antifriction bearing elements located in and movable through said recirculation channel, a portion of said recirculation channel comprising a groove forming a bearing raceway for said antifriction bearing elements wherein said antifriction bearing elements are operable to be in a load carrying position, said bearing cartridges being rotatably supported on said second member whereby at least one cartridge is operable to have its antifriction bearing elements make rolling contact with said oppositely inclined surfaces of each of said pair of oppositely inclined surfaces on said first member whereby said first member is supported for linear movement with respect to said second member.

4. The invention set forth in claim 3 wherein:

said bearing raceways formed on said bearing cartridges comprise a pair of oppositely inclined planar surfaces and said antifriction bearing elements are operable to engage each of said oppositely inclined planar surfaces on said bearing cartridges and each of said oppositely inclined planar surfaces on said first member when said antifriction bearing elements are in said load carrying position supporting said first member for linear movement with respect to said second member.

5. The invention set forth in claim 4 wherein:

said bearing cartridges each include passageways formed therein and interconnected with said groove portion forming said bearing raceway to define a recirculation channel for said antifriction bearing elements and said bearing cartridges include retaining members for said antifriction bearing elements, said retaining members comprising substantially flat plates mounted in said bearing cartridges and bisecting said recirculation channel.

6. The invention set forth in claim 5 wherein:

said retaining members include substantially oval openings formed therein and defining the periphery of a recirculation path for said antifriction bearing elements.

7. In a linear antifriction bearing arrangement, in combination:

a first member including a pair of opposed elongated parallel grooves forming bearing raceways;

a second member linearly movable with respect to said first member and including a plurality of antifriction bearing cartridges removably mounted thereon, said bearing cartridges each comprising a cylindrical support block including a groove formed on one end thereof and a plurality of antifriction bearing elements operable to roll along said groove on said support block;

said second member having said plurality of bearing cartridges so arranged thereon that at least one bearing cartridge is disposed adjacent each groove of said pair of opposed parallel grooves on said first member and said antifriction bearing elements of each of said plurality of bearing cartridges are engaged with the respective adjacent groove on said first member whereby said second member is supported for linear movement with respect to said first member; and, said second member including cylindrical bores dimensioned to receive said support blocks in close fitting relationship whereby said support blocks are each operable, upon engagement of their antifriction bearing elements with said opposed parallel grooves on said first member, to rotate in said bores to align said grooves on said support blocks to be parallel with said pair of opposed parallel grooves on said first member.

* * * * *